United States Patent [19]
Medlin et al.

[11] 4,354,381
[45] Oct. 19, 1982

[54] SONIC ATTENUATING METHOD FOR DISTINGUISHING BETWEEN OIL, WATER AND GAS

[75] Inventors: William L. Medlin; Lucien Masse, both of Dallas; James H. Sexton, Duncanville, all of Tex.

[73] Assignee: Mobil Oil Corporation, New York, N.Y.

[21] Appl. No.: 221,477

[22] Filed: Dec. 30, 1980

[51] Int. Cl.³ .............................................. E21B 49/00
[52] U.S. Cl. ...................................................... 73/151
[58] Field of Search ................... 73/151, 152; 181/102, 181/105; 367/25, 35, 80, 28, 30, 34

[56] References Cited

U.S. PATENT DOCUMENTS 3,205,941  9/1965  Walker ............................... 367/30 X

OTHER PUBLICATIONS

"Effects of Pressure and Fluid Saturation on the Attenuation of Elastic Waves in Sands", by G. H. F. Gardner, et al; Journal of Petroleum Technology; Feb. 1964, pp. 189-198 Petroleum Transactions.
"A New Approach to the Study of Elastic Propagation in Rocks" by F. F. Evision.
"The Variation of the Elastic Constants of Rocks with Frequency", by Dr. J. McG. Bruckshaw and P. C. Mahanta; Petroleum, Jan. 1954.
"A Review of the Progress in the Measurement of Dynamic Elastic Properties", by K. W. Hillier.
"Elastic Behaviour of Rocks at Low Frequencies", by M. J. Usher Geophysical Prospecting X.
"Internal Friction in Shear and Shear Modulus of Solenhofen Limestone over a Frequency Range of $10^7$ Cycles per Second" by Louis Peselnick And W. F. Outerbridge; Journal of Geophysical Research vol. 66, No. 2 Feb. 1961.
"Propagation of Elastic Waves in a Cylindrical Bore Containing a Fluid", by M. A. Biot; Journal of Applied Physics; vol. 23, No. 9, Sep. 1952.
"Permeability Profiles From Acoustic Logging", by J. J. Staal; Society of Petroleum Engineers of AIME.

Primary Examiner—Jerry W. Myracle
Attorney, Agent, or Firm—Charles A. Huggett; Michael G. Gilman; James F. Powers, Jr.

[57] ABSTRACT

A novel method is disclosed for using the resonance behavior of reservoir sand to distinguish between oil-rich, gas-rich and water-rich zones. A wellbore is logged, as for example with a long spaced acoustic logging tool, to obtain data which are then interpreted to determine the damping of the acoustic signal in one sand versus another, or in that sand versus a reference sand having similar resonance characteristics.

14 Claims, 4 Drawing Figures

SONIC ATTENUATING METHOD FOR DISTINGUISHING BETWEEN OIL, WATER AND GAS

RELATED APPLICATIONS

The present application is related to U.S. patent application Ser. No. 231,716, filed Feb. 5, 1981, entitled "Harmonic Oscillator For Measuring Dynamic Elastic Constants of Rock Materials", filed in the name of William Louis Medlin, et al, and assigned of the assignee of the present application;

The present application is also related to U.S. patent application Ser. No. 221,479, filed Dec. 30, 1980, entitled "A Method for Measuring the Resonance of Rock Material", also filed in the names of William Louis Medlin, et al, and also assigned to the assignee of the present application, which application is hereby incorporated by reference as if fully set forth herein.

BACKGROUND OF THE INVENTION

Many seismic investigation techniques have been developed for the purpose of ascertaining the nature of formations located in the vicinity of an open borehole.

One technique which has achieved widespread acceptance is that of acoustic well logging. Such logging generally utilizes an acoustic logging tool having a transmitter and receiver mounted thereon up to about 15–20 feet apart. This logging tool is moved through the borehole at a pre-selected speed while the transmitter is periodically activated. The transmission of waves through surrounding formations is then determined by recording and analyzing the acoustic energy received at the logging tool receiver. Generally, such data are analyzed to determine the velocity of at least the compression wave traveling through the adjacent formation to determine the nature of that formation. Attempts are also often made to determine the velocity of the shear wave and tube waves which travel in or in the vicinity of the wellbore. Such velocities are then utilized to identify formations disposed adjacent to the borehole.

Various techniques have been suggested for resonance measurements in geologic materials. In addition to the methods described in the above-identified, related patent applications, it is known to measure the resonant frequency of such materials using a bar resonance technique. Another quantity associated with resonance is the loss factor "Q". In a frequency vs. amplitude plot, where $f_0$ is the frequency at which amplitude is at its maximum ($A_0$), let amplitudes $A_1$ and $A_2$ equal $A_0$ divided by the square root of 2. Amplitudes $A_1$ and $A_2$ will occur at frequencies $f_2$ and $f_1$ which are respectively greater and lesser than $f_0$. The loss factor "Q" is determined by the formula:

$$Q = f_0/(f_2 - f_1)$$

Gardner, et al have reported various Q values for Berea materials by using a bar resonance method and frequencies of the order of 10 kHz. See Journal of Petroleum Technology, February, 1964, page 189.

Although various methods have been suggested for determining the nature of fluid content contained in reservoir formations, to date, none have been developed which are applicable to all kinds of formations under all conditions.

SUMMARY OF THE INVENTION

The present invention provides a novel method for predicting possible fluid contents of subterranean geologic formations. Under most conditions, gas-rich reservoir rock or sand may be distinguished from comparable liquid containing formations. Under certain conditions, oil-rich formations may be distinguished from comparable water-rich formations.

In accordance with the method of the present invention, the estimated loss factor (Q value) of a zone of reservoir material to be evaluated is compared to a series of experimentally determined loss factors (Q values) which are predictive of the fluid content of that reservoir zone. The aforementioned Q value series is derived by conducting tests on a comparable sample material which is maintained under a confining pressure which corresponds to the overburden pressure at the borehole depth of the reservoir zone under evaluation. During these tests, oil, gas and water saturations are varied within the experimental material to obtain a series of Q values. By correlating the Q value of reservoir material within the zone to this experimentally determined Q value series, the possible fluid content of the reservoir zone may be predicted.

The loss factor (Q value) for the zone of reservoir material under investigation may be estimated through attenuation analysis when the experimental Q value series predicts potential reservoir Q values in the 0–40 range. Under such conditions, reservoir zone Q values may be assumed to be related to the attenuation coefficient $\alpha$ of an acoustic logging signal through the equation:

$$\alpha = f/Qv$$

where
f = frequency and
v = velocity.

Consequently, the damping of the acoustic signal may be directly compared to the damping of the signal for a comparable material at another borehole location, or may be used to estimate the Q value of the in situ reservoir material.

Accordingly, a primary object of the present invention is the provision of a method for predicting the possible fluid content of a reservoir zone of rock or sand material.

A further object of the present invention is the provision of a method for predicting the possible gas and liquid contents of such zones.

Another aim of the present invention is the provision of a method for predicting the possible oil and water contents in such zones.

These and other objects of the present invention will become apparent from the following, more detailed, description.

DESCRIPTION OF THE PREFERRED EMBODIMENTS

Figure 1:
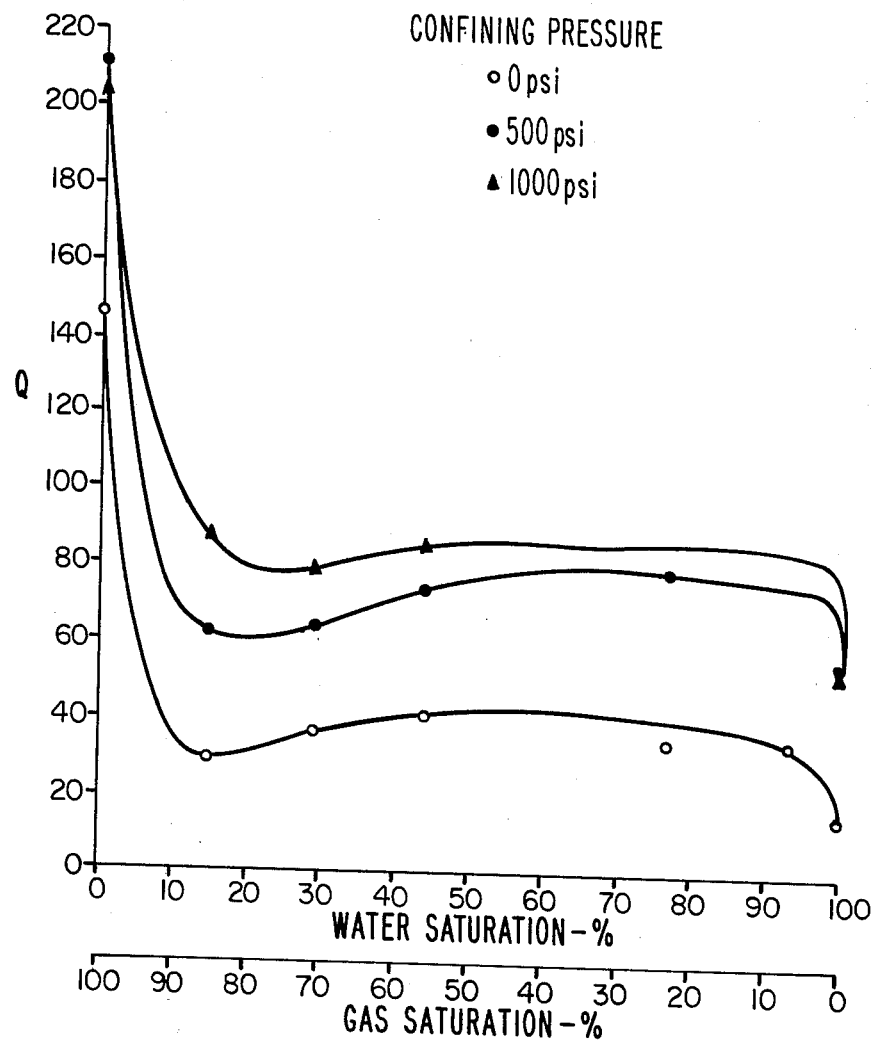
FIG. 1 is a plot of Q values vs. % water saturation for a water-gas saturated Berea quarry sandstone contained in an RNF shrink jacket at confining pressures of 0 psi, 500 psi and 1000 psi.

Although specific techniques and examples have been selected for the purpose of illustration in the following description, one of ordinary skill in this art will appreciate that various modifications can be made to these techniques and in these examples without departing from the scope of the present invention, which is defined more particularly in the appended claims.

The present invention relates to the provision of a method for predicting the possible oil, gas and/or water contents of zones of reservoir materials. In accordance with the method of this invention, a reservoir material from the zone to be investigated is sampled. This sample is then analyzed to determine its type. It is then ascertained whether resonance data are available for a comparable sample which would obviate any necessity to conduct resonance testing directly on that sample. Such data normally will exist when geologically similar reservoir materials from wells of comparable locations and depths have already been the subject of resonance testing in accordance with the present invention.

In the event that comparable resonance test data are not already available for the sample, the sample will then be subjected to a regimen of tests intended to develop data on the resonance behavior of the sample material at different saturations of various fluids and fluid combinations. Such fluids will typically include oil, gas and/or water.

Table I shows results derived from resonance measurements taken using the low frequency resonance test methods disclosed in the above-identified, related patent applications. Such tests use frequencies ranging from between 50-300 Hz. Although these low frequencies are currently preferred, frequencies of up to 5000 Hz, or less preferably, up to 10,000 Hz are currently believed to be suitable for use in deriving such resonance data. Similarly, although less preferred, bar resonance methods may be used to derive the required data relating to such samples.

Table I reports data derived from resonance measurements on six reservoir sands. Berea sandstone is a well-known laboratory standard. The West Ranch sand is from a Texas Gulf Coast reservoir, while the Owen Chalk Well sand is from a North Texas reservoir. A Dutch offshore reservoir is the source of the Rotliegendes sand; a southern California diatomaceous earth reservoir the source of the Diatomite formation; and a shallow tertiary recovery zone in north central Texas the source of the Salem Unit sand. All measurements were made on long cylindrical rod samples saturated with gas, water & gas, and oil & gas, respectively.

TABLE I

| Sample | Depth-Ft | Q-Gas/Water | Q-Gas Only | Q-Gas/Oil |
|---|---|---|---|---|
| Berea | Surface | 40 | 150 | 20 |
| West Ranch | 5506 | 9.1 | 57 | 20 |
| Owen Chalk Well | 1572 | 11 | 42 | 24 |
| Rotliegendes-As Cored | 11,500 | 5.1 | 47 | 5.1 |
| Rotliegendes-Extracted | 11,500 | 8.9 | 42 | 4.1 |
| Diatomite-As Cored | 3530 | 59 | 75 | — |
| Diatomite-Extracted | 3530 | 16 | 60 | 51 |
| Salem Unit | 1800 | 25 | 47 | 11 |

The results of Table I illustrate that additions of water result in very large reductions of Q values as compared to gas-only saturations. Accordingly, low frequency [50-300 Hz] signals are damped much more in water-rich than in gas-rich zones. Although in the Rotliegendes sand, oil had about the same effect on damping as water, in the other materials tested, oil additions caused distinguishably different damping than water additions.

In accordance with the method of the present invention, if the expected Q values range to less than 40, the reservoir zone under investigation is acoustically logged to estimate the resonance loss factor for that zone. Although the details of various theoretical approaches to determining the resonance loss factor of the zone have not yet been worked out, within certain ranges, the resonance loss factor of a reservoir zone may be assumed to be proportional to the attenuation of acoustic logging waves in that zone. It is clear, for example, that small Q values in the resonance measurements taken on experimental materials correspond to high damping of vibratory motion and, therefore, large attenuation of waves within the acoustically logged reservoir zone. The evaluation of relative magnitudes holds for Q values between zero and forty, and more particularly between zero and twenty. Q values below 20 correspond to rather severe damping and high attenuation of acoustic logging waves. In this range of Q values, modest reductions in the value of the loss factor will be expected to correspond to large increases in attenuation. For Q values above 30-40, the damping is not severe and reductions in Q are not as significant in terms of attenuation effects.

Once the Q value for a reservoir zone has been estimated, this value should be compared with the experimentally determined data relating to the resonance behavior of a comparable test material with differing fluid saturations. As explained above, since changes in Q depend upon the nature and degree of saturation of the reservoir material, a comparison of the Q value of the reservoir material in situ with known experimental data enables prediction of the nature and amount of fluid in the reservoir zone under investigation.

Figure 2:
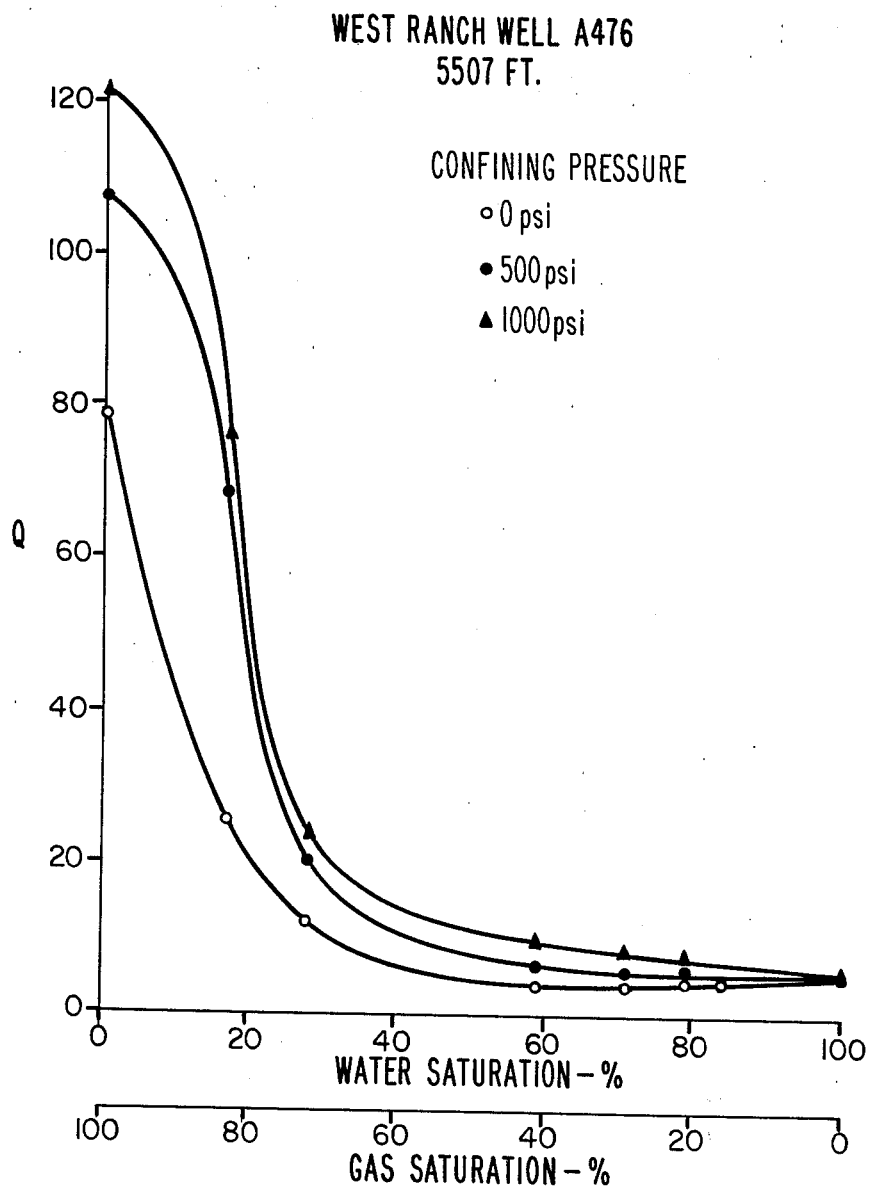
FIG. 2 is a Q value vs. % water saturation plot similar to FIG. 1, but for a water-gas saturated reservoir sand taken from West Ranch Well A476, Jackson County, Tex., at 5507 ft.
Figure 3:
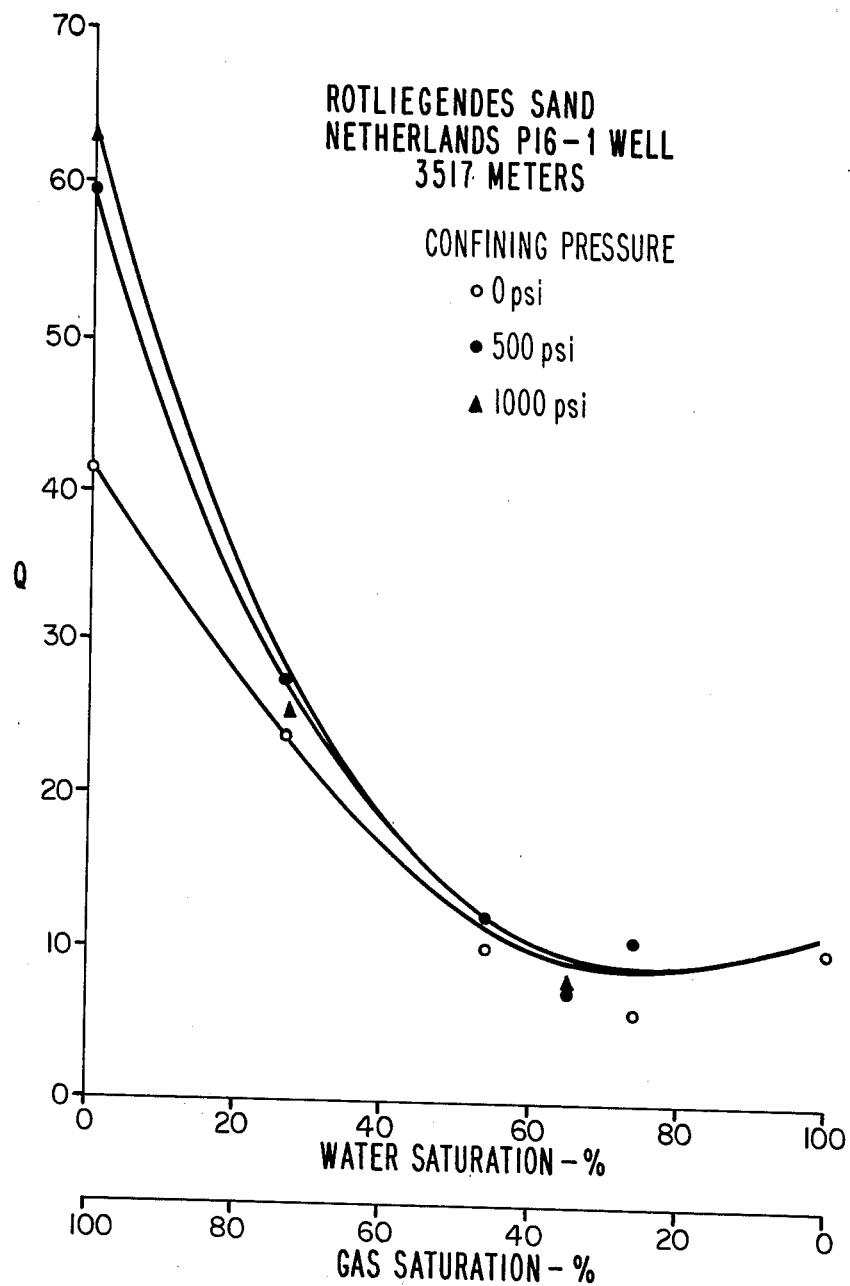
FIG. 3 is a Q value vs. % water saturation plot similar to FIGS. 1-2, but for water-gas saturated Rotliegendes sand from P16-1 well, offshore Netherlands, at 3517 meters.

In order to standardize data resulting from resonance measurements on reservoir samples, it is advantageous to conduct resonance testing on those samples at pressures which correspond to the overburden pressure in the reservoir zone under investigation. For purposes of illustration, in FIGS. 1-3, Q value versus gas/water saturations of the Berea, West Ranch and Rotliegendes sands of Table 1 are illustrated. In each of these Figures, confining pressures of 0 psi, 500 psi, and 1,000 psi were applied to the subject material, which was contained in a RNF shrink jacket.

It should be noted that all of the curves in the figures show the same general behavior, with large increases in Q with increasing gas saturations. The detailed behaviors illustrated in FIGS. 1-3, however, suggest that the method of the present invention will have much greater commercial significance for some reservoir zones and materials than others. In the Berea sample of FIG. 1, for example, most of the decrease in Q occurs over the first 10-15% addition of water and, under containing pressure, the lowest Q is greater than 30. Since, as discussed above, substantial degrees of attenuation will not be expected in acoustic logging of the zones having Q values greater than 40, it is unlikely that acoustic logging of such a Berea zone will produce significant attenuation data which is capable of distinguishing between water and gas saturations in the range of gas/water saturations typical of commercial reservoirs.

On the other hand, in the West Ranch and Rotliegendes samples, the drop in Q is spread over a much broader range of water saturations and the Q values fall well below 20. Thus, the large changes in Q values for these sands are very significant and occur over gas/water saturations typical of commercial reservoirs. As mentioned above, the data collected for FIGS. 1-3 were obtained at frequencies of 50-300 Hz. It may be expected that similar results would be obtained at somewhat higher logging frequencies, that is, at frequencies below 10,000 Hz., and preferably below 5,000 Hz. Although not yet conducted, Q measurements similar to those of FIGS. 1-3 for gas/oil, water/oil and/or gas/water/oil systems are expected to provide similar results of practical consequence.

Figure 4:
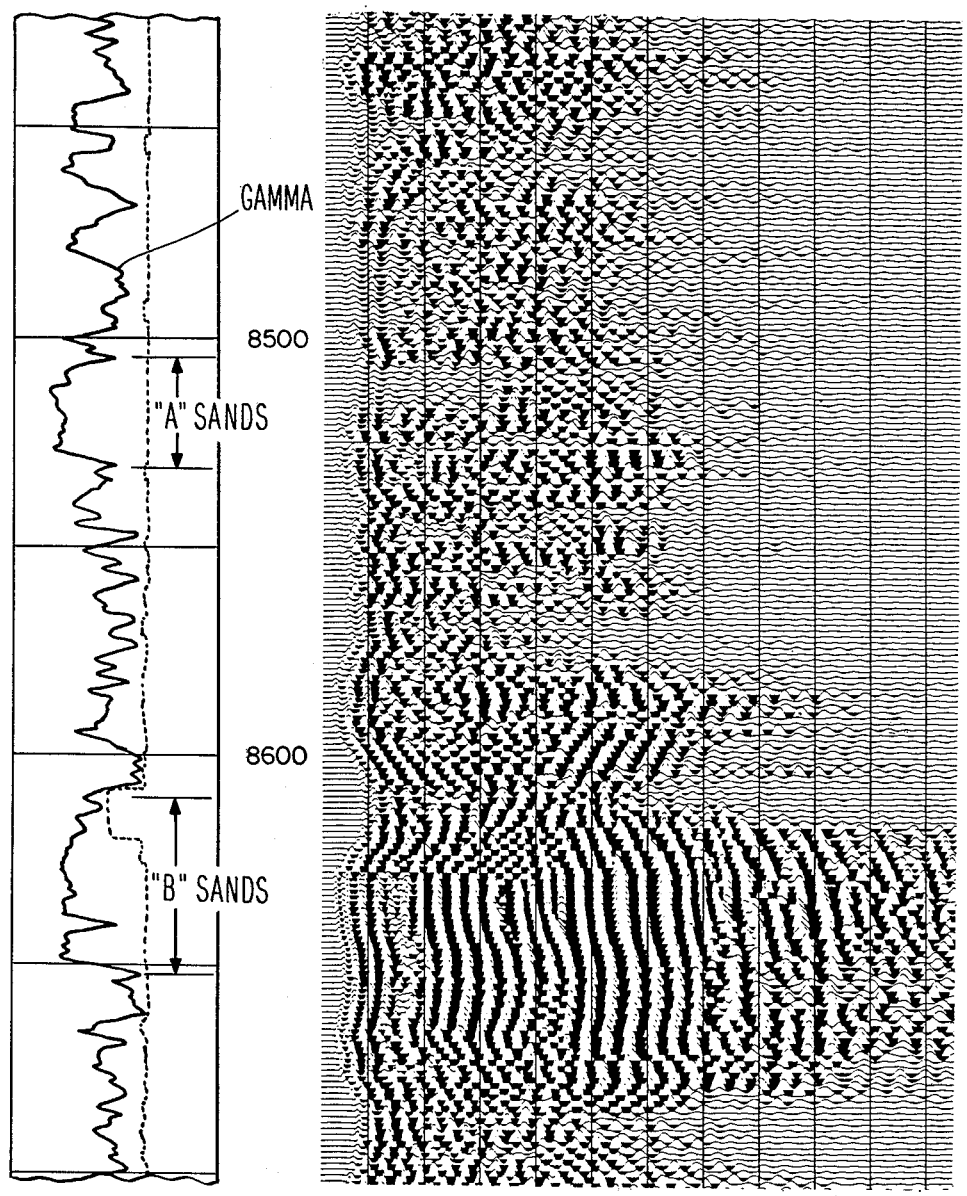
FIG. 4 is a VDL display obtained from a long spaced acoustic logging tool (right hand display) disposed adjacent to a gamma log (left hand trace), which logs were obtained from Piceance Creek 31-13 massive frac gas well.

One approach for estimating attenuation of acoustic logging waves, and thus the Q value of the reservoir zone, is to take advantage of the damping effects in acoustic log signals. This may be done using existing logging tools such as Mobil's long spaced acoustic logging tool. One such example of this technique is illustrated in FIG. 4. This Figure shows a VDL display obtained with this tool in Mobil's Pieance Creek 31-13 massive frac gas well. The sands in this well are generally comparable to the Dutch Rotliegendes sands of Table I and FIG. 3. In FIG. 4, two sands have been labled "A" and "B" which have been determined to be of similar quantity based on the gamma log displayed on the left of FIG. 4. It will be noted that damping of the acoustic signal is much greater in the A sand than in the B sand, as evidenced by the much stronger later arrivals of the acoustic signals in the latter sand. Assuming other factors to be equal, it is thus predicted that the gas saturation is significantly higher in the B sand, which prediction is in accordance with the effects of gas/water saturation illustrated by FIG. 3.

As seen from the above, an extremely simple method for predicting the possible fluid content of reservoir zones has been described. The prediction of the nature and amount of fluid saturation in a given reservoir zone through this method should be of great commercial significance.

What is claimed is:

1. A method for predicting the possible fluid content of a zone of reservoir material disposed at a known depth, comprising the steps of:
   (a) sampling said material to determine at least its resonance behavior type, if known; or if not known, determining its resonance behavior type by:
      (i) subjecting samples of said material to pressures comparable to to the overburden pressures found at said depth of said zone,
      (ii) saturating said samples of said material with differing selected amounts of at least one fluid suspected of being present in said zone within the range of said differing selected amounts; and
      (iii) resonance testing said samples to determine the behavior of the resonance loss factor (Q value) while containing such differing selected amounts of said at least one fluid;
   (b) estimating the resonance loss factor (Q value) of said reservoir zone; and
   (c) positively correlating the resonance loss factor (Q value) of said reservoir zone to the resonance loss factors of said resonance behavior type to predict the possible fluid content of said zone.

2. The method of claim 1 wherein said samples are saturated with differing selected amounts of water.

3. The method of claim 2 wherein said differing amounts ranges from between 0 to 100% water.

4. The method of claim 1 wherein said samples are saturated with differing selected amounts of gas.

5. The method of claim 1 wherein said samples are saturated with differing selected amounts of oil.

6. The method of claim 1 wherein said samples are saturated with differing selected amounts of water and gas.

7. The method of claim 1 wherein said samples are saturated with differing selected amounts of water and oil.

8. The method of claim 1 wherein said samples are saturated with differing selected amounts of gas and oil.

9. The method of claim 1 wherein said samples are saturated with differing selected amounts of gas, water and oil.

10. The method of claim 1 wherein step (a) (iii) is performed at frequencies between 50 and 300 Hz.

11. The method of claim 1 wherein step (a) (iii) is performed by the spring-mass resonance method.

12. The method of claim 1 wherein said estimating is performed by acoustically logging a borehole disposed through said zone.

13. The method of claim 12 wherein the resonance loss factor is estimated by determining the acoustic wave attenuation within said zone.

14. The method of claim 12 wherein the damping effect of logging waves is used to estimate the resonance loss factor of said zone by determining the relative numbers of late wave arrivals detected in at least two reservoir zones.

* * * * *

UNITED STATES PATENT AND TRADEMARK OFFICE
CERTIFICATE OF CORRECTION

PATENT NO. : 4,354,381

DATED : October 19, 1982

INVENTOR(S) : W.L. Medlin, L. Masse and J.H. Sexton

It is certified that error appears in the above-identified patent and that said Letters Patent is hereby corrected as shown below:

Column 2, line 35, "$\alpha=f/Qv$" should be --$\alpha=\pi f/Qv$--.

Column 5, line 44, "quantity" should be --quality--.

Signed and Sealed this

Nineteenth Day of July 1983

[SEAL]

Attest:

GERALD J. MOSSINGHOFF

Attesting Officer     Commissioner of Patents and Trademarks